(12) United States Patent
Bae et al.

(10) Patent No.: US 11,519,835 B2
(45) Date of Patent: Dec. 6, 2022

(54) METHOD OF PREDICTING JOINING STRENGTH OF JOINED DISSIMILAR MATERIALS

(71) Applicants: Hyundai Motor Company, Seoul (KR); Kia Motors Corporation, Seoul (KR); Industry-University Cooperation Foundation Sogang University, Seoul (KR)

(72) Inventors: Yu Jin Bae, Seongnam-si (KR); Jae Ho Kim, Seoul (KR); Heung Jae Choi, Incheon (KR); Dong Choul Kim, Seoul (KR)

(73) Assignees: Hyundai Motor Company, Seoul (KR); Kia Motors Corporation, Seoul (KR); Industry-University Cooperation Foundation Sogang University, Seoul (KR)

( * ) Notice: Subject to any disclaimer, the term of this patent is extended or adjusted under 35 U.S.C. 154(b) by 917 days.

(21) Appl. No.: 16/374,019

(22) Filed: Apr. 3, 2019

(65) Prior Publication Data

US 2020/0124509 A1    Apr. 23, 2020

(30) Foreign Application Priority Data

Oct. 18, 2018   (KR) ......................... 10-2018-0124164

(51) Int. Cl.
| | | |
|---|---|---|
| *B62D 65/02* | (2006.01) | |
| *G01N 3/08* | (2006.01) | |
| *G01N 3/02* | (2006.01) | |
| *G06N 3/08* | (2006.01) | |

(52) U.S. Cl.
CPC ............... *G01N 3/02* (2013.01); *B62D 65/02* (2013.01); *G01N 3/08* (2013.01); *G06N 3/08* (2013.01)

(58) Field of Classification Search
CPC . G01N 3/02; G01N 3/08; G01N 19/04; B62D 65/02; G06N 3/04; G06N 3/02; G06Q 50/04
See application file for complete search history.

(56) References Cited

U.S. PATENT DOCUMENTS

2017/0074310 A1\* 3/2017 Jang ......................... F16B 5/04

\* cited by examiner

*Primary Examiner* — Lee A Holly
(74) *Attorney, Agent, or Firm* — Slater Matsil, LLP

(57) ABSTRACT

A method of predicting joining strength of joined dissimilar materials, includes performing a joining strength test on a plurality of specimens of joined dissimilar materials each having different joining information, and acquiring force-displacement data on a basis of the joining information; constructing, in a prediction system, an artificial neural network model for predicting the force-displacement data and the joining strengths from the joining information; learning the artificial neural network model by inputting the force-displacement data to the prediction system, the force-displacement data obtained through the joining strength test; inputting joining information to be predicted to the prediction system by using a computer running a software for performing prediction for the joining strength and connected to a host computer of the prediction system through a network; and predicting, by the learned artificial neural network model, force-displacement value and joining strength.

18 Claims, 6 Drawing Sheets

[FIG. 1]
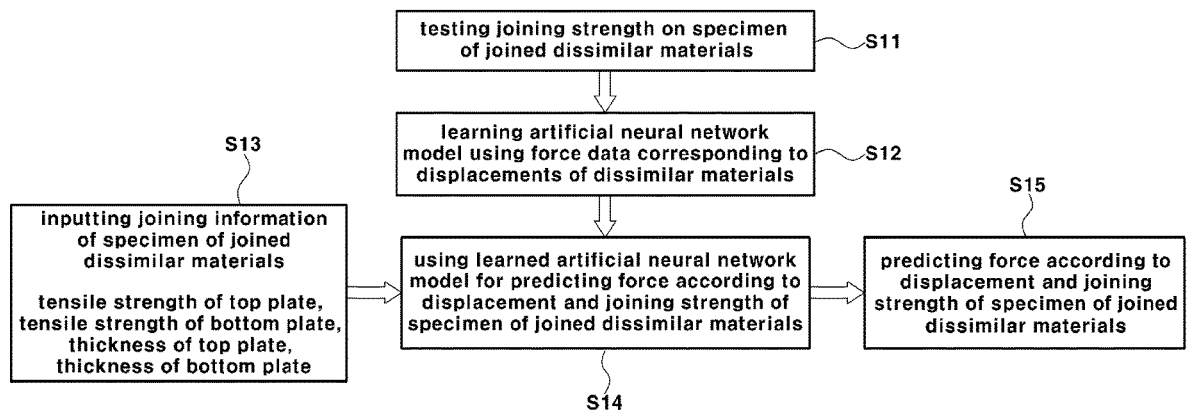
[FIG. 2]
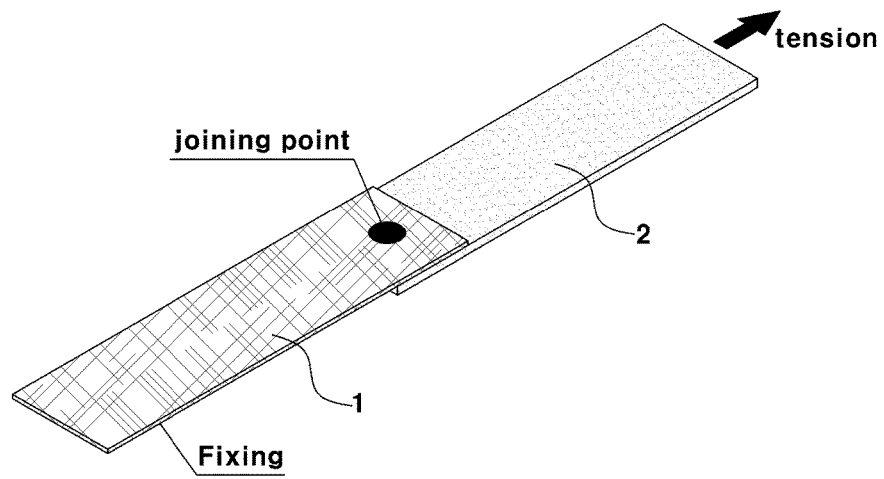

[FIG. 3]
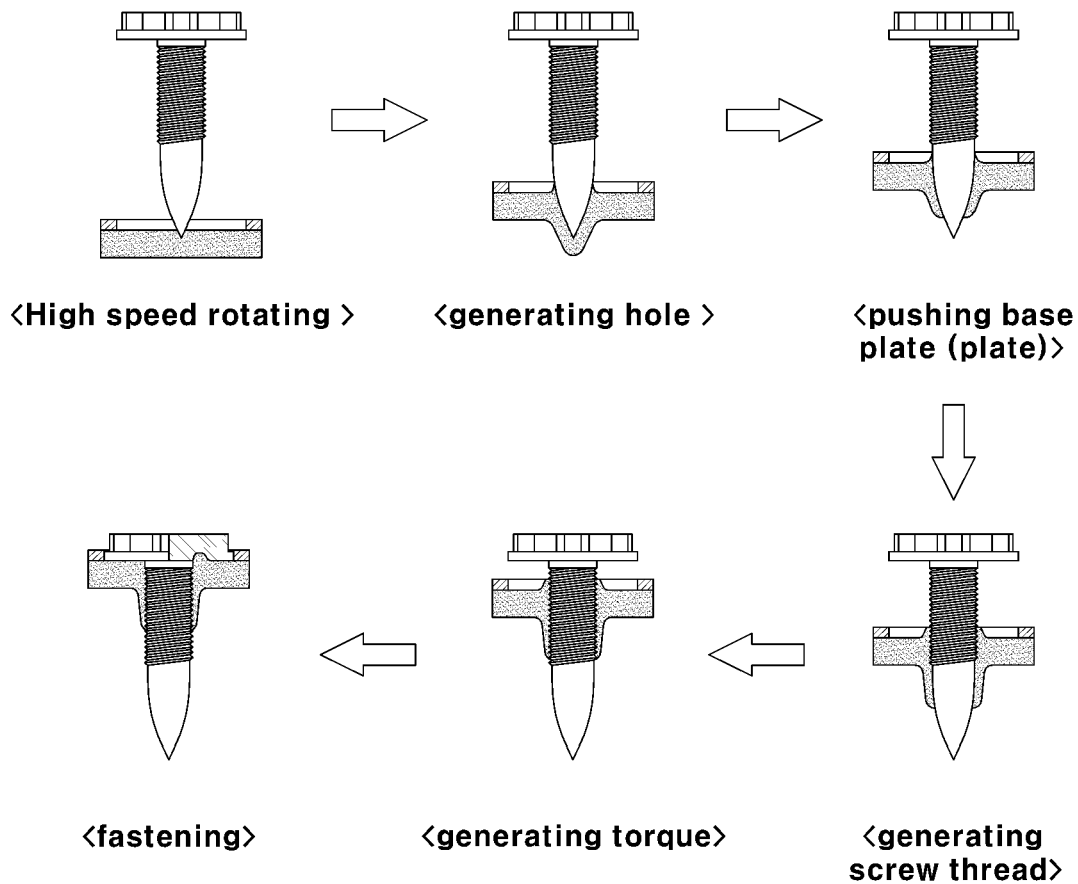
[FIG. 4]
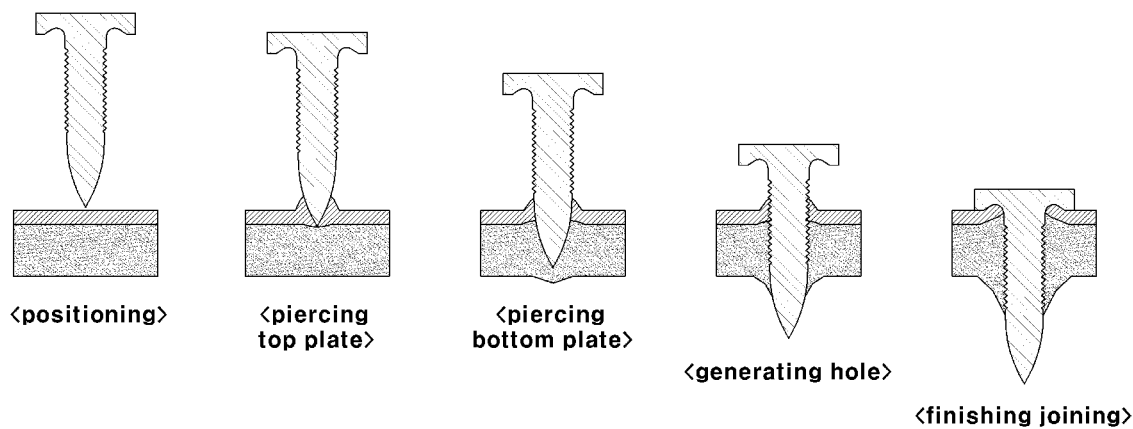

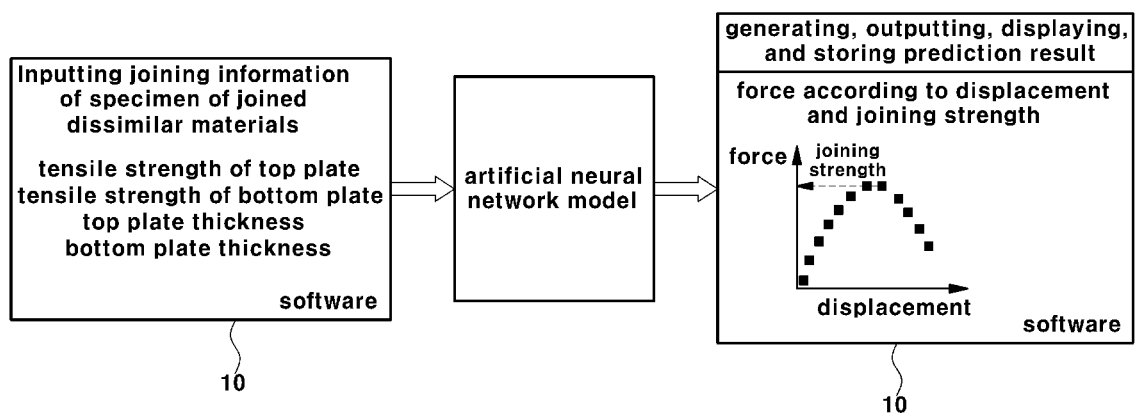

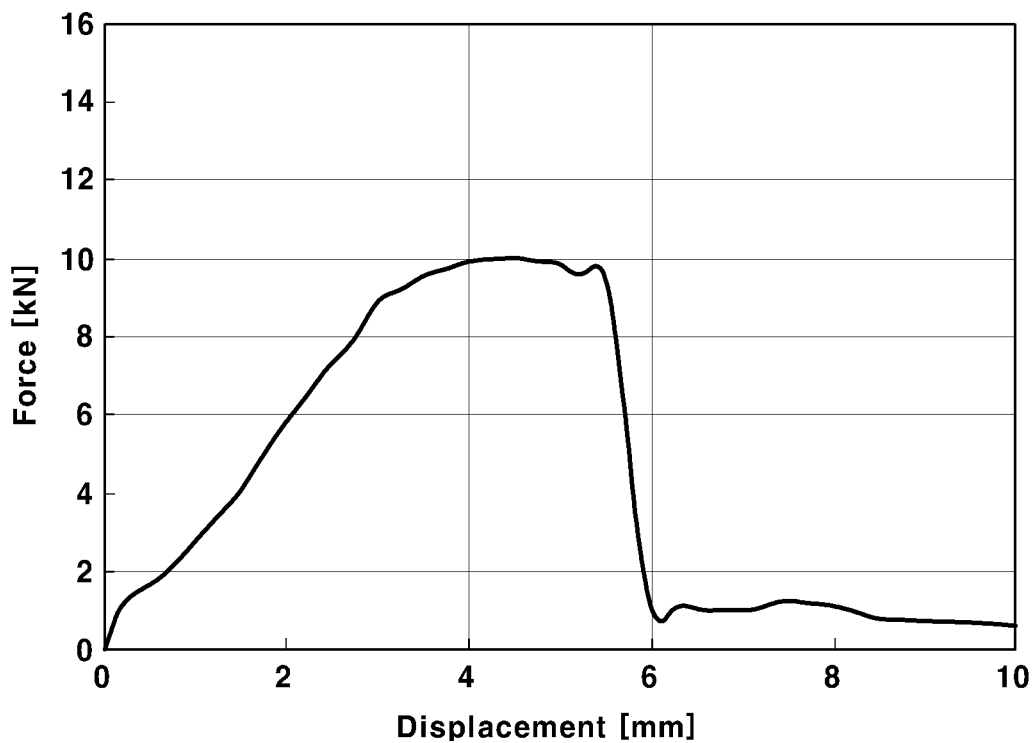
[FIG. 7]

[FIG. 8]
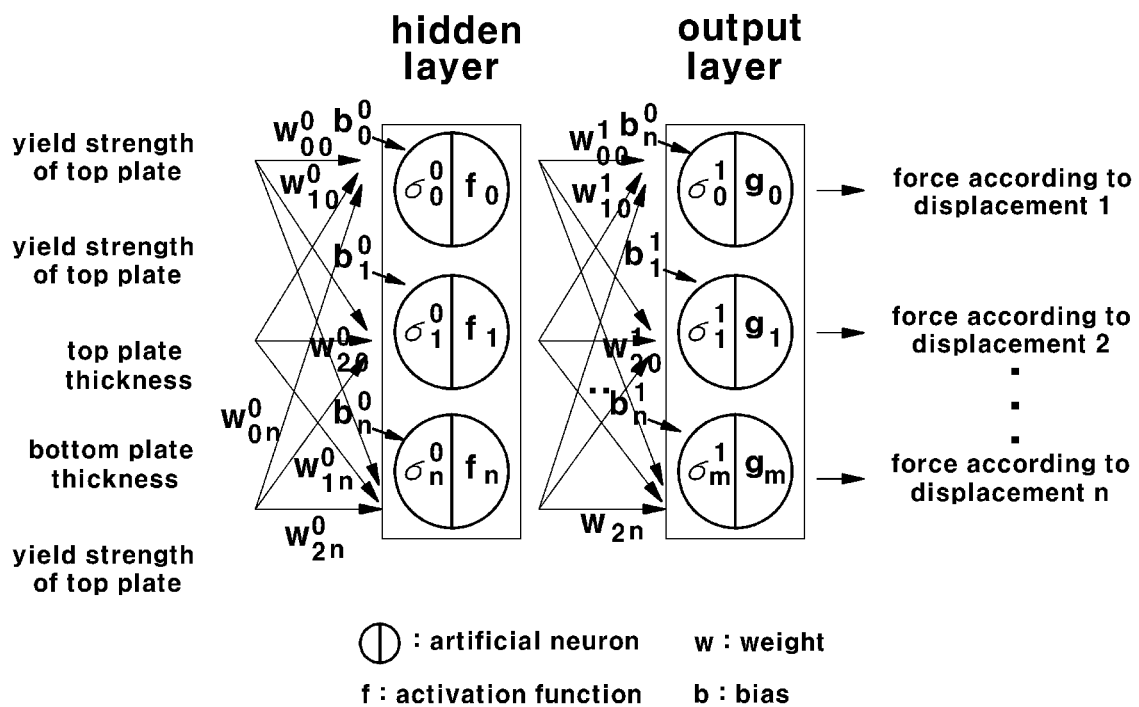
[FIG. 9]
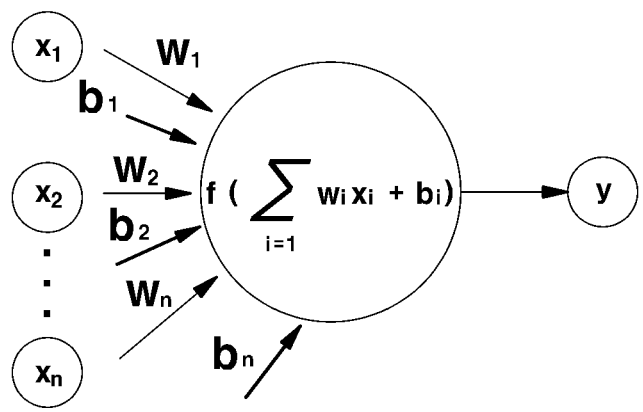
$f(x1 \times w1 + b1 + x2 \times w2 + b2 + \cdots + xm \times wn + bn) = y$

[FIG. 10]

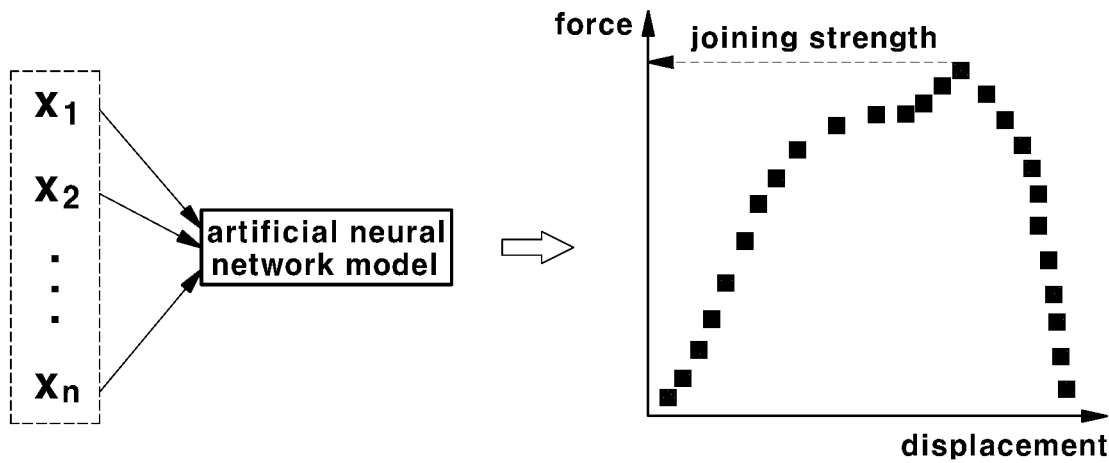

[FIG. 11]

definition of first nodes $$\begin{bmatrix} \sigma_0^0 \\ \sigma_1^0 \\ \vdots \\ \sigma_{41}^0 \end{bmatrix} = \begin{bmatrix} w_{00}^0 & w_{01}^0 & \cdots & w_{03}^0 \\ w_{10}^0 & w_{11}^0 & \cdots & w_{13}^0 \\ \vdots & \vdots & & \vdots \\ w_{410}^0 & w_{401}^0 & \cdots & w_{403}^0 \end{bmatrix} \begin{bmatrix} x_0 \\ x_1 \\ x_2 \\ x_3 \end{bmatrix} + \begin{bmatrix} b_0^0 \\ b_1^0 \\ \vdots \\ b_{40}^0 \end{bmatrix}$$

joining information 41 x 4 matrix          41 x 1 matrix $f(\sigma) = \tanh(\sigma)$ force at each interval 0.25mm between 0mm and 20mm $$\begin{bmatrix} \sigma_0^1 \\ \sigma_1^1 \\ \vdots \\ \sigma_{81}^1 \end{bmatrix} = \begin{bmatrix} w_{00}^1 & w_{01}^1 & \cdots & w_{041}^1 \\ w_{10}^1 & w_{11}^1 & \cdots & w_{141}^1 \\ \vdots & \vdots & & \vdots \\ w_{810}^1 & w_{811}^1 & \cdots & w_{8141}^1 \end{bmatrix} \begin{bmatrix} f(\sigma_0^0) \\ f(\sigma_1^0) \\ \vdots \\ f(\sigma_{41}^0) \end{bmatrix} + \begin{bmatrix} b_0^1 \\ b_1^1 \\ \vdots \\ b_{81}^1 \end{bmatrix}$$

81 x 4 matrix          81 x 4 matrix

METHOD OF PREDICTING JOINING STRENGTH OF JOINED DISSIMILAR MATERIALS

CROSS-REFERENCE TO RELATED APPLICATIONS

This application claims priority to Korean Patent Application No. 10-2018-0124164, filed on Oct. 18, 2018, which application is hereby incorporated herein by reference.

TECHNICAL FIELD

The present invention generally relates to a method of predicting joining strength of joined dissimilar materials.

BACKGROUND

Recently, the need for reducing weight of a vehicle is increasing to improve fuel efficiency and reduce exhaust gas. Accordingly, there are efforts to reduce weight of a vehicle body, which forms a great part of the weight of the vehicle.

Especially, techniques for applying light-weight metal materials instead of steel used in the art are actively being developed. In order to achieve the above object, a key part of the techniques is a technique of joining the light-weight metal materials to an existing steel structure.

Recently, according to a trend of a high strength and light weight of the vehicle body, as materials of the vehicle body, there are many cases in which plastic composite materials, such as steel plates (such as an ultra-high strength steel, etc.), non-ferrous plates (such as aluminum and magnesium), fiber reinforced plastics (FRP), fiber reinforced plastics (CFRP), and glass fiber reinforced plastics (GFRP), are applied.

Since the plastic composite materials are excellent in strength, modulus of elasticity, lightweight, and safety, the plastic composite materials are popular as one of main materials in the airline industry or the automobile industry, and the automobile industry expects to expand usage of the plastic composite materials in future and to significantly increase production volume thereof.

Each of plastic composite materials is made by impregnating fiber materials in plastic resin and curing. For example, the fiber material may be produced in a winding shape or a fabric shape, and then the fiber material may be impregnated in the plastic resin and cured.

In order to produce the plastic composite materials in plates and to apply the plastic composite plates to the vehicle body, it should be possible to join the plastic composite plates with steel plates. Here, due to physical characteristics of the two materials, laser welding or spot welding is not possible.

For this reason, in the related art, the plastic composite plates and the steel plates, which are dissimilar materials, are joined to each other in very limited joining methods such as a joining method using structural adhesives or a mechanical type joining method using fasteners such as screws and rivets.

Meanwhile, a plate made by joining the dissimilar materials should sufficiently meet strength, which is required as a material of parts of the vehicle to be used in the parts of the vehicle such as the vehicle body. Especially, since the plate is made by joining the dissimilar materials, joining strength between the materials should be large.

Therefore, in order to select and use the materials, it is necessary to measure joining strengths for various joined dissimilar materials with different combinations of materials.

In the related art, for measuring the joining strengths of the various joined dissimilar materials, specimens of the joined dissimilar materials were directly produced for various combinations of materials and material thicknesses. In addition, tensile tests were performed on the all of produced specimens, and obtained data were used.

However, for performing the tests of the specimens, it is necessary to produce the specimens of various plates having different combinations of the material and material thickness. As a result, much cost and time are required for producing molds of the specimens for processing joining of the specimens.

Recently, with increasing application of lightweight parts, the combinations of materials and thicknesses become more and more diverse, and time and expense exponentially increase to produce and test the specimens of all individual combination.

SUMMARY

Accordingly, the present invention has been made keeping in mind the above problems occurring in the related art. Embodiments of the invention provide a technique through which the joining strength for each of dissimilar combinations and new combinations is predicted without producing and testing all specimens is needed. For example, embodiments of the present invention provide a method of predicting joining strength of joined dissimilar materials without producing or testing specimens.

According to an embodiment of the present invention, the present invention provides a method of predicting joining strength of joined dissimilar materials. The method includes performing a joining strength test on a plurality of specimens of joined dissimilar materials that each have different joining information. Force-displacement data is acquired on the basis of the joining information of the plurality of specimens of joined dissimilar materials. A prediction system is used to construct an artificial neural network model for predicting the force-displacement data and the joining strengths of the specimens of joined dissimilar materials from the joining information of the specimens of joined dissimilar materials. By inputting the force-displacement data to the prediction system, the artificial neural network model learns that the force-displacement data obtained through the joining strength test on the basis of the joining information of the specimens of joined dissimilar materials. Joining information of a specimen of joined dissimilar materials to be predicted is input to the prediction system by using a computer that is capable of running software for performing prediction for the joining strength and is connected to a host computer of the prediction system through a network. The method includes predicting, by the learned artificial neural network model, a force-displacement value and joining strength of the specimen of joined dissimilar materials to be predicted, on the basis of the joining information of the specimen of joined dissimilar materials to be predicted.

Therefore, according to the method of predicting joining strength of the joined dissimilar materials of the present invention, it is possible to predict the force-displacement and the joining strength of the joined materials from the joining information of dissimilar materials by using the learned artificial neural network model without producing and testing actual specimens. In addition, when the joined dissimilar materials are developed, time and cost involved in production and testing of the specimens of the joined dissimilar materials may be reduced.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a flowchart showing a prediction process for predicting joining strength of joined dissimilar materials according to the present invention.

FIG. 2 is a view showing a specimen of joined dissimilar materials which can be produced and used in the joining strength test of the present invention.

FIG. 3 is a view showing the flow drill screw (FDS) type joining process or the flow form screw (FFS) type joining process in which plates with dissimilar materials are joined using a high-speed rotation screw.

FIG. 4 is a view showing the RIVTAC type joining process in which the plates with dissimilar materials are joined using a tack rivet.

FIG. 5 is a schematic diagram showing a configuration of a prediction system of the present invention.

FIG. 6 is a view showing a software screen for inputting joining information of a specimen of joined dissimilar materials that is object of prediction of the present invention.

FIG. 7 is a graph showing an example of force data corresponding to displacement (force-displacement data) predicted by a learned artificial neural network model of the present invention.

FIGS. 8 to 10 are views showing an artificial neural network model used of the present invention.

FIG. 11 is a more detailed view showing the artificial neural network model of the present invention, which predicts force corresponding to displacement.

DETAILED DESCRIPTION OF ILLUSTRATIVE EMBODIMENTS

Hereinafter, exemplary embodiments of the present invention will be described in detail with reference to the accompanying drawings so that the invention can be easily embodied by one of ordinarily skilled in the art to which the present invention belongs. Various changes to the following embodiments are possible and the scope of the present invention is not limited to the following embodiments.

Unless the context clearly indicates otherwise, it will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

The present invention relates to a method of predicting joining strength of joined dissimilar materials, in which plates of dissimilar materials are joined to each other.

Particularly, the present invention relates to a method of predicting force according to displacement (force-displacement) and joining strength of the joined dissimilar materials without producing and testing an actual specimen, in which the joined dissimilar materials are configured in the form of similar combinations and new combinations.

More particularly, the present invention has a technical characteristic, in which prediction of the force-displacement and the joining strength of the joined dissimilar materials can be performed by a learned artificial neural network model, depending on a tensile strength (that relates to the materials) and thicknesses of a top plate and a bottom plate of the joined dissimilar materials, without producing and testing an actual specimen.

In the present invention, prediction of force-displacement and the joining strength of the joined dissimilar materials may replace actual specimen tests. From joining information of joined dissimilar materials, that is, from tensile strengths and thickness information of a top plate and bottom plate of the joined dissimilar materials, the force-displacement and the joining strength of a joined portion of the joined dissimilar materials (that are not produced as an actual specimen) may be predicted using the learned artificial neural network model.

According to the present invention, only when a joining strength test is performed for learning the artificial neural network model and acquiring data for learning thereof, the joined dissimilar materials are produced as specimens in various combinations, and the joining strength test is performed for each of combinations. Thereafter, when prediction of the force-displacement and the joining strength of joined dissimilar materials to be predicted is performed by the learned artificial neural network model, an additional specimen of joined dissimilar materials to be predicted is not produced.

However, in the following description, it is assumed that there exists a specimen of joined dissimilar materials that is an object for predicting the force-displacement and the joining strength by using the learned artificial neural network model.

Although the actual specimen of the joined dissimilar materials to be predicted does not exist because the force-displacement and the joining strength thereof are predicted by using the learned artificial neural network model, the joined dissimilar materials to be subjected to the joining strength prediction will be referred to as 'a specimen of joined dissimilar materials' in the following description.

The specimen of joined dissimilar materials' used in the following description means a virtual specimen of the joined dissimilar material to be predicted in which top and bottom plates are joined to each other.

Hereinafter, a method of predicting joining strength of joined dissimilar materials according to the present invention will be described with reference to the accompanying drawings. FIG. 1 is a flowchart showing a prediction process for predicting the joining strength of joined dissimilar materials according to the present invention. This drawing shows the prediction process in which the force according to displacement and joining strength of the specimen of joined dissimilar materials are predicted by using an artificial neural network.

The artificial neural network model constructed in a prediction system of the present invention learns using relationship between inputs (joining information) and outputs (the force according to displacement and the joining strength). In addition, the joining information of the specimen of joined dissimilar materials, that a user wants to predict, is input to the learned artificial neural network model. Therefore, the force according to displacement and the joining strength corresponding to the joining information of the specimen of joined dissimilar materials may be predicted by using the artificial neural network model.

A system of predicting the joining strength of the joined dissimilar materials of the present invention, which can predict the force according to displacement of the specimen of joined dissimilar materials (force-displacement) and the joining strength, includes: a prediction system having a database in which information needed for prediction of force according to displacement and the joining strength is stored, a plurality of computers including a host computer connected to the database, and a network connecting the computers to each other; and an artificial neural network model constructed in the prediction system and learning prediction of the joining strength of the joined dissimilar materials by input data.

As known in the art, the computers described herein will include a processor (i.e., a single processor or multiple processors) coupled to memory, which stores instructions in the form of software. The instructions are executed by the processor to achieve the results described here.

Referring to the prediction process in FIG. 1, in order to construct and learn the artificial neural network model that is possible to predict the force according to displacement and the joining strength of the specimen of joined dissimilar materials, the joining strength test (a tensile test for the specimen of joined dissimilar materials) for the specimen of joined dissimilar materials is performed S11, and force-displacement data according to the joining information of the specimen of joined dissimilar materials (referring to force data according to displacement shown in FIGS. 5, 7, and 10) is obtained through the joining strength test.

Here, the information for the joining strength may include: top plate thickness and bottom plate thickness of the specimen of joined dissimilar materials; and tensile strength or yield strength of each of the top and bottom plates, and may further include: a joining type.

In addition, in result data of the joining strength test, i.e., result data (test data) of the tensile test for the specimen, the joining strength may be defined as a maximum value of the force data according to displacement.

When the joining strength test is performed, a specimen of joined dissimilar materials is produced by joining a top plate and a bottom plate, which have predetermined thicknesses with known tensile strengths (or yield strengths) as the joining information, and then the tensile test is performed on the specimen.

Here, the thicknesses of the top and bottom plates are already known as the joining information of the specimen, and a force value according to the displacement is obtained as the test data through the test.

The joining strength test will be described in more detail with reference to FIG. 2. The drawing shows a specimen of joined dissimilar materials which can be used in the joining strength test during the joining strength test of the present invention.

In order to perform the joining strength test, the specimen, in which the top plate 1 and the bottom plate 2 are joined to each other, is actually produced as shown in FIG. 2, and then the produced specimen is mounted to test equipment that is capable of applying tensile load on the specimen. Here, one of the top plate 1 and the bottom plate 2 may be fixed by the test equipment, and equipment such as a known universal material tester or a tensile tester that may apply the tensile load may be used for the other.

In addition, during the joining strength test, when a portion where the top plate 1 and the bottom plate 2 are joined and fixed is regarded as a joining point as shown in FIG. 2, one of the top plate 1 and the bottom plate 2 is fixed by the test equipment, the force is applied to the other in a tensile direction, and shearing force is applied to the joining point between the plates.

After actually producing the specimen of joined dissimilar materials, the tensile test is performed by using the test equipment to measure the force according to displacement and the joining strength of the specimen of joined dissimilar materials.

Since the joining strength test is a static test, it is not necessary to specify the top plate 1 and the bottom plate 2 separately as a fixed plate and a tensile plate shown in FIG. 2. In addition, regardless of separation of the top and bottom plates, one of the top and bottom plates should be fixed, and the other plate should receive the force in the tensile direction.

When tensile force is applied, a predetermined tensile speed may be applied, for example, the force according to displacement control may be measured at the tensile speed of 10 mm/min.

The tensile force is applied and maintained until the specimen of joined dissimilar materials is broken, and as a test result, force data according to displacement may be obtained.

In addition, the force may be extracted at a predetermined interval (for example, 0.25 mm), on the basis of the displacement in the data obtained through the test, i.e. the force data according to the measured displacement. In addition, the extracted force may be used as data for learning the artificial neural network model.

Here, as the data obtained by extracting the force for each displacement value at the predetermined interval, the data may be obtained as a graph regarding the force-displacement (forms of graphs in FIGS. 5, 7, and 10).

The joining information of the specimen of joined dissimilar materials and the obtained test data are input to the prediction system through the computer, and the artificial neural network model learns with the information and data S12.

When the artificial neural network model learns, weight w and bias b of the artificial neural network model are optimized by input-output data as described below.

Hereafter, when a user inputs joining information of a specimen of joined dissimilar materials to be predicted to the learned artificial neural network model by using a computer, which may run a software for predicting the joining strength and be connected to the host computer of the prediction system through the network S13, the force according to displacement and the joining strength of the specimen of joined dissimilar materials to be predicted is predicted by the artificial neural network model S14 and S15, and the prediction result is output and displayed through the computer, and stored in the computer so as to be confirmed by the user.

Here, the joining information of the specimen of joined dissimilar materials to be predicted, which is input by the user for predicting the force and the joining strength of the specimen of joined dissimilar materials, is the physical and dimensional information of the top and bottom plates of the specimen of joined dissimilar materials. Accordingly, the joining information may include the tensile strength (or yield strength) and thickness information of each of top and bottom plates (referring to S13 in FIG. 1), and may further include information of the joining type.

In the present invention, examples of combinations of dissimilar materials of joined materials (i.e. a specimen of joined materials) may include as described below.

1. Aluminum (plate/casting material/extracted material— steel (normal steel sheet/high strength steel sheet) joining ex. A6082 3.0t+SGAFC590 1.6t 2. Aluminum (plate/casting material/extracted material)—composite material (CFRP/SMC, etc.) joining ex. A60014 1.2t+CFRP RTM 2.2t 3. Aluminum (plate/casting material/extracted material)—aluminum (plate/casting material/extracted material) joining ex. A5182 1.2t+A365 3.0t Here, 3.0t, 1.6t, 1.2t, and 2.2t mean thicknesses of 3.0 mmm, 1.6 mm, 1.2 mm, and 2.2 mm, respectively, SMC means 'Sheet Molding Compound', and RTM means 'Resin Transfer Molding'.

In addition, examples of methods of joining dissimilar materials of the present invention may include the flow drill screw (FDS) type or flow form screw (FFS) type joining process, using a high-speed rotation screw (MS832-01) capable of joining dissimilar materials to each other, or the RIVTAC type joining process, using a tack rivet capable of joining dissimilar materials to each other.

In the construction and learning process of artificial neural network, the specimen of joined dissimilar materials having various combinations of materials and thicknesses is produced using one of various joining types described above. In addition, as the joining information, the test data are obtained for each of the joining types, the top plate thickness, the bottom plate thickness, the tensile strength (or the yield strength) of the top plate, and the tensile strength (or the yield strength) of the bottom plate.

In addition, by processing the test data, average force-displacement data is obtained for each of joining type, thickness of the top and bottom plates, and tensile strength (or yield strength) of the top and bottom plates.

In addition, force data of each specimen is extracted whenever displacement of each specimen increases by a predetermined amount (ex, every 0.25 mm increasing). In addition, the extracted data is determined as target data (i.e. output data) and stored in a database.

The artificial neural network is constructed, and learns by using the obtained information and data.

FIG. 3 is a view showing the FDS type joining process or the FFS type joining process, in which plates with dissimilar materials are joined using the high-speed rotation screw, and FIG. 4 is a view showing the RIVTAC type joining process, in which plates with dissimilar materials are joined using a tack rivet.

FIG. 5 is a schematic diagram showing a configuration of the prediction system of the present invention. When the user inputs joining information regarding a specimen of joined dissimilar materials to be predicted to the computer 10, which is connected to the host computer of the prediction system through the network capable of running the software to predict joining strength, the prediction is performed by the artificial neural network model constructed in the software of the prediction system.

Here, the joining information of the specimen of joined dissimilar materials input by the user, i.e., a predicted value corresponding to the physical and dimensional information of the top and bottom plates of the specimen, is obtained by the learned artificial neural network model.

As shown in FIG. 5, as the software for predicting the joining strength is run in the computer 10 of the user, the prediction is performed by the artificial neural network model in the prediction system connected with the computer through the network. In addition, when a force value according to displacement and joining strength value of the specimen of joined dissimilar materials are obtained as a result of the prediction, information obtained as the result is output and displayed through the computer 10, and stored in the computer 10.

Referring to FIG. 5, as the result of the prediction, the force data according to the displacement and the joining strength regarding the specimen of joined dissimilar materials that is a maximum value of the force are finally obtained at the computer 10.

Hereinabove, although the example of the user inputting the tensile strength which is the physical information of the top and bottom plates as the joining information of the specimen to be predict to predict the force and the joining strength of the specimen is described, the tensile strength may be replaced by the yield strength.

FIG. 6 is a view showing a screen of the software for inputting user known joining information of the specimen of joined dissimilar materials to be predicted to predict the force and the joining strength of the specimen of joined dissimilar materials. Here, the screen may be configured such that the user selects one of FFS, FDS, and RIVTAC joining processes as the joining type, and inputs thicknesses and yield strength of top and bottom plates.

Also, when the artificial neural network model learns, the same joining information regarding the specimen of joined dissimilar materials and the force-displacement test data obtained through the joining strength test may be input to the artificial neural network model through the software.

That is, the artificial neural network model may learn using the force-displacement test data, with the joining type, the tensile strength (or the yield strength) of the top plate, the tensile strength (or the yield strength) of the bottom plate, the top plate thickness, and the bottom plate thickness.

As described above, when the tensile strengths (or the yield strengths) of the top and bottom plates, the top plate thickness, and the bottom plate thickness are input to the learned artificial neural network model, the force-displacement and the joining strength may be predicted by using the learned artificial neural network model.

FIG. 7 is a graph showing an example of the force data according to the displacement (force-displacement) predicted by the learned artificial neural network model of the present invention. Here, a maximum value of the force data is the joining strength.

FIGS. 8 to 10 are views showing the artificial neural network model used of the present invention, wherein FIG. 8 is a view showing a detailed configuration of the artificial neural network model, which predicts the force according to displacement and the joining strength according to the joining information of the specimen of joined dissimilar materials.

FIG. 8 shows, an example of using the yield strength of the top plate, the yield strength of the bottom plate, the top plate thickness, and the bottom plate thickness as the joining information of the specimen of joined dissimilar materials. Here, the artificial neural network model is divided into a hidden layer and an output layer, and each of layers is configured with artificial neurons.

In addition, when the joining strength test is performed on the specimen of joined dissimilar materials, learning about the joining information and the existing force-displacement data obtained by the test is carried out in the artificial neural network model.

Here, the artificial neural network model is a model that configures a network of each of nodes (the artificial neurons), and the artificial neural network model defines the weight by learning with the input and the result thereby predicting a result for an optional input.

Referring to FIG. 8, the artificial neurons define relationship between the input and output, and the artificial neurons are configured as the weight w, activation function f, and the bias b.

The output corresponding to the input in the artificial neural network model may be calculated by a formula shown at the bottom of FIG. 9. Since the force according to displacement, i.e., the output corresponding to the joining information of the specimen of joined dissimilar materials, is calculated by the formula, and since the maximum value of the force data is obtained as the joining strength, the force according to displacement and the joining strength may be predicted.

As shown in FIG. 8, learning the artificial neural network model means optimization of the weight w and the bias b for all of artificial neurons in the artificial neural network model.

FIG. 10 is a view showing an example, in which, when the joining information of the specimen of joined dissimilar materials is input, the force according to displacement and the joining strength is obtained by the artificial neural network model. When the artificial neural network model is used, force having various joining conditions may be predicted without formulation or a formula type model.

FIG. 11 is a view showing the artificial neural network model for predicting the force by the displacements in detail. This drawing shows an example of a prediction model of the force according to displacement and the joining strength. The prediction model is applicable to use the artificial neural network model. In addition, software that is easy to use a matrix-type artificial neural network model is needed.

In the above description, although the embodiment of the present invention has been described in detail, the scope of the present invention is not limited to the embodiment, and various modifications and changes using basic concept of the present invention defined in the accompanying claims by one of ordinary skill in the air to which this invention belongs is also included in the scope of the present invention.

What is claimed is:

1. A method of predicting joining strength of joined dissimilar materials, the method comprising:
   performing a joining strength test on a plurality of specimens of joined dissimilar materials each having different joining information;
   acquiring force-displacement data on a basis of the joining information of the plurality of specimens of joined dissimilar materials;
   constructing, in a prediction system, an artificial neural network model for predicting the force-displacement data and the joining strengths of the specimens of joined dissimilar materials from the joining information of the specimens of joined dissimilar materials;
   learning the artificial neural network model by inputting the force-displacement data to the prediction system, the force-displacement data obtained through the joining strength test on the basis of the joining information of the specimens of joined dissimilar materials;
   inputting joining information of a specimen of joined dissimilar materials to be predicted to the prediction system by using a computer that is capable of running a software for performing prediction for the joining strength and is connected to a host computer of the prediction system through a network; and
   predicting, by the learned artificial neural network model, a force-displacement value and joining strength of the specimen of joined dissimilar materials to be predicted on the basis of the joining information of the specimen of joined dissimilar materials to be predicted.

2. The method of claim 1, wherein, in performing the joining strength test on the plurality of specimens of joined dissimilar materials and acquiring the force-displacement data, the joining information includes top plate thickness and bottom plate thickness of each of the specimens of joined dissimilar materials; and tensile strength or yield strength of each of top and bottom plates.

3. The method of claim 2, wherein, in performing the joining strength test on the plurality of specimens of joined dissimilar materials and acquiring the force-displacement data, the joining information further includes a joining type for joining the top and bottom plates of each of the specimens of joined dissimilar materials to each other.

4. The method of claim 1, wherein, in predicting the force-displacement data and the joining strength of the specimen of joined dissimilar materials to be predicted by the prediction system, the joining information includes top plate thickness and bottom plate thickness of the specimen of joined dissimilar materials to be predicted and tensile strength or yield strength of each of top and bottom plates of the specimen of joined dissimilar materials to be predicted.

5. The method of claim 4, wherein, in predicting the force-displacement data and the joining strength of the specimen of joined dissimilar materials to be predicted by the prediction system, the joining information further includes a joining type for joining the top and bottom plates of the specimen of joined dissimilar materials to each other.

6. The method of claim 1, wherein the joining information used to perform the joining strength test includes top plate thickness and bottom plate thickness of each of the specimens of joined dissimilar materials.

7. The method of claim 1, wherein the joining information used to perform the joining strength test includes tensile strength or yield strength of each of top and bottom plates.

8. The method of claim 1, wherein the joining information used to predict the force-displacement value and joining strength includes top plate thickness and bottom plate thickness of the specimen of joined dissimilar materials to be predicted.

9. The method of claim 1, wherein the joining information used to predict the force-displacement value and joining strength includes tensile strength or yield strength of each of top and bottom plates of the specimen of joined dissimilar materials to be predicted.

10. The method of claim 1, wherein, in performing the joining strength test on the plurality of specimens of joined dissimilar materials and acquiring the force-displacement data, a force value of each of the specimens of joined dissimilar materials is calculated whenever displacement thereof increases by a predetermined amount, so the force-displacement data is obtained.

11. The method of claim 1, wherein, in predicting the force-displacement value and the joining strength, the joining strength is defined as a maximum value of force according to displacement in the force data.

12. A method of making a vehicle, the method comprising:
    selecting two dissimilar materials;
    using the method of claim 1 to predict joining strength of the two dissimilar materials; and
    joining the two dissimilar materials.

13. A method of predicting joining strength of joined dissimilar materials, the method comprising:
    performing a joining strength test on a plurality of specimens of joined dissimilar materials each having different joining information, wherein the joining information used to perform the joining strength test includes top plate thickness and bottom plate thickness of each of the specimens of joined dissimilar materials and tensile strength or yield strength of each of top and bottom plates;

acquiring force-displacement data on a basis of the joining information of the plurality of specimens of joined dissimilar materials;

constructing, in a prediction system, an artificial neural network model for predicting the force-displacement data and the joining strengths of the specimens of joined dissimilar materials from the joining information of the specimens of joined dissimilar materials;

learning the artificial neural network model by inputting the force-displacement data to the prediction system, the force-displacement data obtained through the joining strength test on the basis of the joining information of the specimens of joined dissimilar materials;

inputting joining information of a specimen of joined dissimilar materials to be predicted to the prediction system by using a computer that is capable of running a software for performing prediction for the joining strength and is connected to a host computer of the prediction system through a network; and predicting, by the learned artificial neural network model, a force-displacement value and joining strength of the specimen of joined dissimilar materials to be predicted on the basis of the joining information of the specimen of joined dissimilar materials to be predicted, wherein the joining information used to predict the force-displacement value and joining strength includes top plate thickness and bottom plate thickness of the specimen of joined dissimilar materials to be predicted and tensile strength or yield strength of each of top and bottom plates of the specimen of joined dissimilar materials to be predicted.

14. The method of claim 13, wherein, in performing the joining strength test on the plurality of specimens of joined dissimilar materials and acquiring the force-displacement data, the joining information further includes a joining type for joining the top and bottom plates of each of the specimens of joined dissimilar materials to each other.

15. The method of claim 13, wherein, in predicting the force-displacement data and the joining strength of the specimen of joined dissimilar materials to be predicted by the prediction system, the joining information further includes a joining type for joining the top and bottom plates of the specimen of joined dissimilar materials to each other.

16. The method of claim 13, wherein, in performing the joining strength test on the plurality of specimens of joined dissimilar materials and acquiring the force-displacement data, a force value of each of the specimens of joined dissimilar materials is calculated whenever displacement thereof increases by a predetermined amount, so the force-displacement data is obtained.

17. The method of claim 13, wherein, in predicting the force-displacement value and the joining strength, the joining strength is defined as a maximum value of force according to displacement in the force data.

18. A method of making a vehicle, the method comprising:
    selecting two dissimilar materials;
    using the method of claim 13 to predict joining strength of the two dissimilar materials; and
    joining the two dissimilar materials.

* * * * *